UNITED STATES PATENT OFFICE.

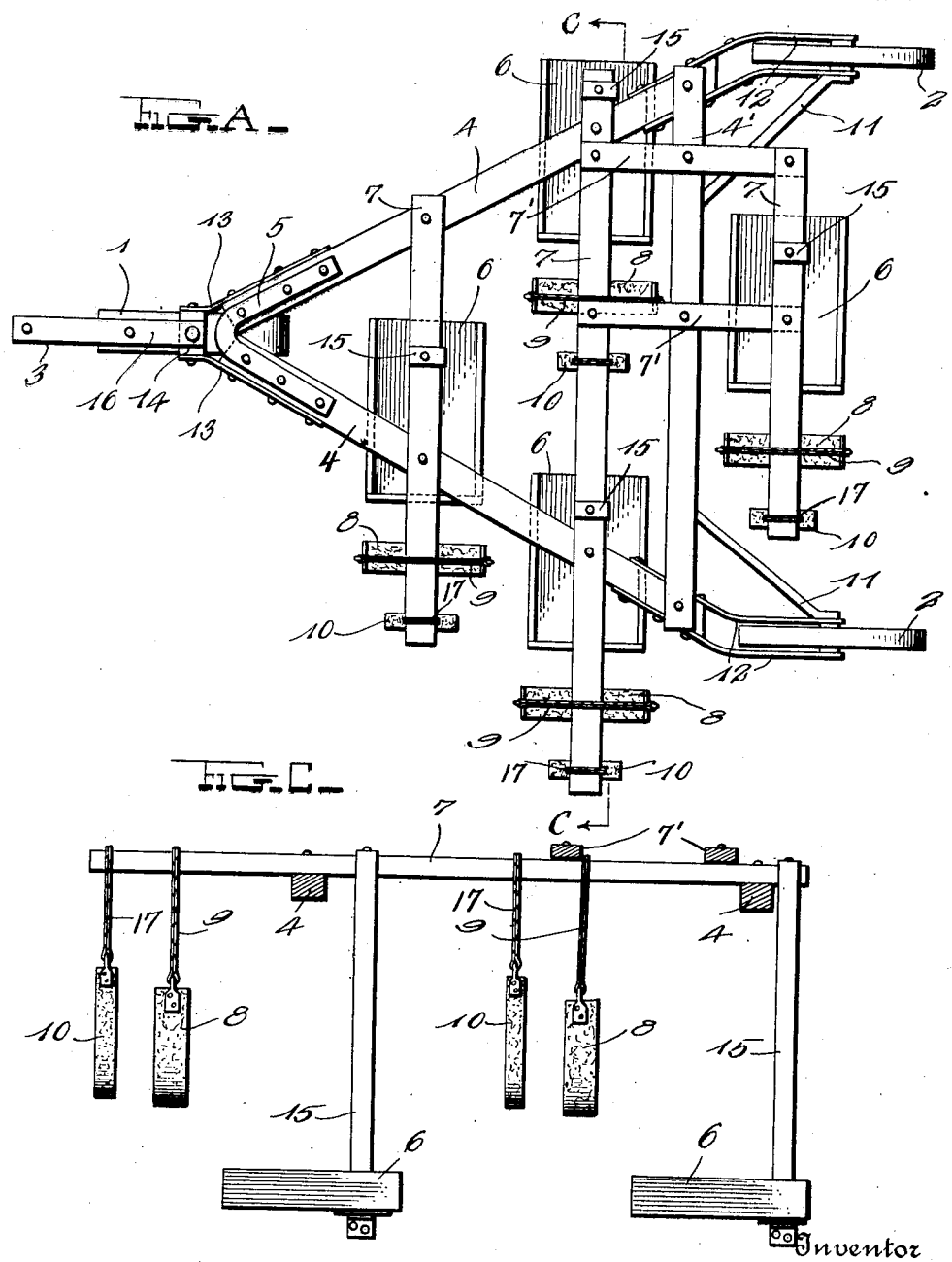

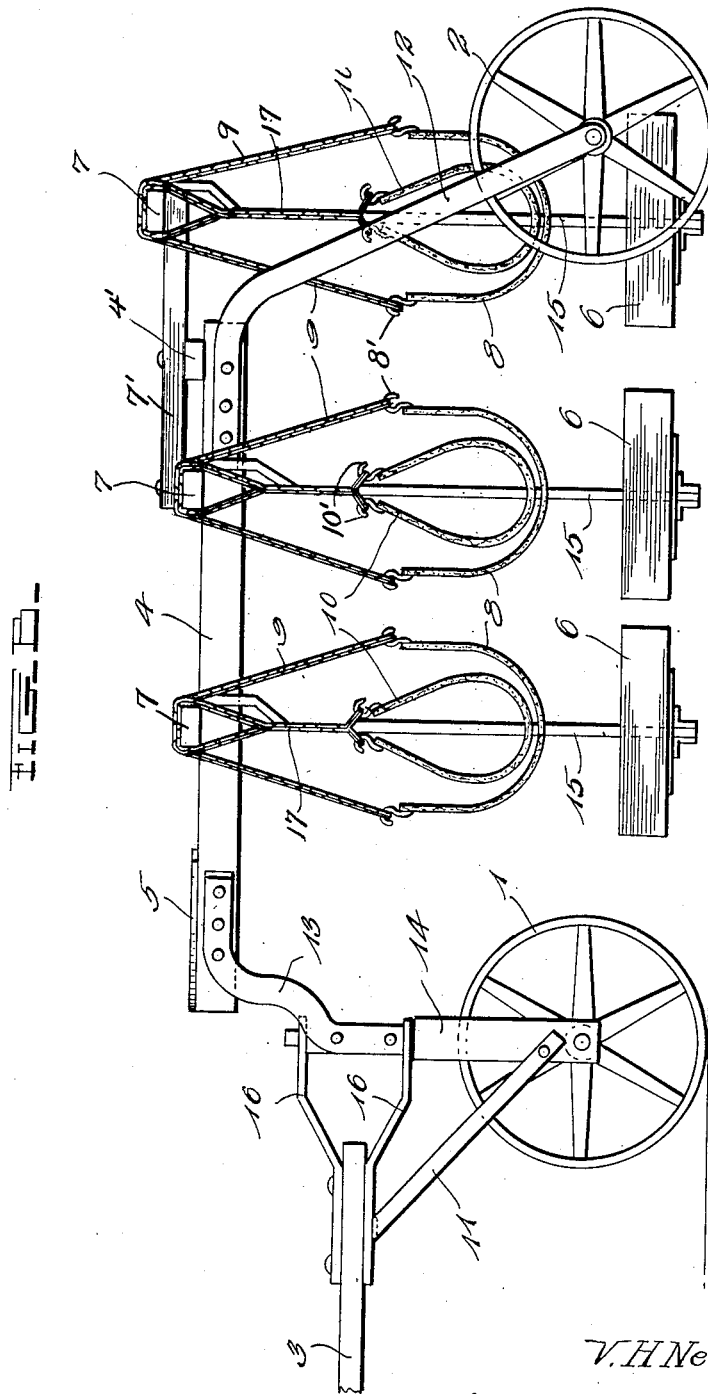

VIRGIL H. NELSON, OF SANDY, UTAH, ASSIGNOR OF ONE-HALF TO BARNARD J. STEWART, OF SALT LAKE CITY, UTAH.

AGRICULTURAL MACHINE.

1,370,347.  Specification of Letters Patent.   Patented Mar. 1, 1921.

Application filed June 18, 1920. Serial No. 389,943.

*To all whom it may concern:*

Be it known that I, VIRGIL H. NELSON, a citizen of the United States, residing at Sandy, in the county of Salt Lake and State of Utah, have invented certain new and useful Improvements in Agricultural Machines; and I do declare the following to be a full, clear, and exact description of the invention, such as will enable others skilled in the art to which it appertains to make and use the same.

This invention relates to an improved agricultural machine, and one object of the invention is to provide a machine which may be made use of in thinning and gathering beets, onions, radishes and other vegetables which are planted in rows and must be removed from the rows when thinning or gathering a crop.

Another object of the invention is to so construct this machine that the operators may be supported in the machine in a substantially reclining position where they will be supported in position to easily reach the plants and remove them from the rows thus making it unnecessary to walk across a field to a row and stoop beside the row to remove surplus plants when thinning or to remove the beets or other vegetables when harvesting the crop.

Another object of the invention is to so construct this machine that it may be used for removing plants from a plurality of rows, the operators being supported in the machine with one operator positioned in the proper position for removing plants from a row.

Another object of the invention is to provide a machine which will be comparatively simple in construction and easy to operate.

This invention is illustrated in the accompanying drawings, wherein:

Figure A is a top plan view of the machine.

Fig. B is a view showing the improved machine in side elevation, and

Fig. C is a transverse sectional view taken along the line C—C of Fig. A.

This improved machine is provided with a frame having side bars 4 which extend in diverging relation rearwardly of the machine and have their forward ends connected by a V-shaped bracket 5 which holds the bars against spreading or contracting. A front truck 14 which may be termed a caster is provided at the forward end of the machine and has its stem rotatably mounted in a bearing carried by the bracket arms 13 and this caster is connected with a tongue 3 by arms 16, a brace 11 being provided so that the tongue will be securely supported in the position shown in Fig. B. It will thus be seen that the draft animals can be connected with the tongue 3 and the wheel 1 of the caster will constitute a guiding wheel supporting the forward end of the frame. The rear end portion of the frame is provided with a cross bar 4' which connects the side bars 4 and braces the same against inward movement and these side bars carry depending rearwardly inclined supporting legs or strips 12 between which the rear supporting wheels 2 are rotatably mounted. Bracing strips 11' are provided and extend from the cross bar 4' to the lower ends of the legs or strips 12 to brace the same and prevent them from moving out of the desired position.

In order to support the platforms 6 or kneeling benches as they may be termed, there have been provided cross bars 7 which extend transversely of the frame and carry hanger bars 15 which extend downwardly from the cross bars and have their lower ends connected with the platforms as shown in Figs. B and C. It should be noted that one of the cross bars 7 is positioned to the rear of the cross bar 4' and is supported upon bars 7' which are carried by the cross bar 4' and one of the cross bars 7.

When the machine is in use, the operators kneel upon the platforms 6 or may recline thereon with the body above the waist extending beyond the platform. It will then be necessary to provide supporting means for the head and trunk portion of the body. In order to support the body, there has been provided a sling 8 in front of each platform, the slings 8 being formed of canvas, leather or any other suitable material and provided with hooks 8' for engaging the end portions of the chains which pass over the cross bars 7. When an operator is kneeling or reclining upon the platform 6, the sling 8 will pass around the body, preferably at the chest and thus the body will be supported. By placing the hooks 8' in the proper links of the chain, the slings may be supported at the desired height for the convenience of the operators. It is also desired to provide supporting means for the heads so that the heads will be supported and the necks thus prevented from becoming stiff. In order to do so, there have been provided smaller slings 10 which are also formed of canvas or leather and are provided with hooks 10' for engaging links of the supporting chains 17. These chains are passed about the supporting bars 7 and the chains 17 have their upper ends formed into eyes or loops as shown in Fig. B and have their lower ends provided with forks or branches engaged by the hooks 10'. Therefore, the slings 10 will be held close for proper engagement with the heads. It will thus be seen that when in use, the operator may kneel or recline upon the platform 6 and will be supported beyond the platform by the sling 8 which passes about the chest and will have his head supported by the sling 10. By proper adjustment, the slings 8 and 10 will be positioned at the proper height so that the operator may conveniently reach the plants and remove them from the ground. From an inspection of Fig. A, it will be noted that the platforms 6 are so positioned that four operators may be accommodated in the machine, each operator being suspended above a row of plants. Therefore, four rows of plants may be thinned or harvested with this machine. It is, of course, obvious that the machine may be built for a less number or greater number of rows as desired. It will be further obvious that if so desired, the platforms and slings could be positioned so that two men could work upon a single row thus permitting the machine to be moved faster across a field as the operator at the rear would remove the plants which were missed by the operator at the forward end of the machine. There has thus been provided a plant thinning and vegetable harvesting machine, which will be very efficient in operation and comparatively simple in construction.

What is claimed is:

1. A thinning and harvesting machine comprising a frame, platforms suspended from the frame, a sling suspended in front of each frame for extending about the body of an operator resting upon the platform, and a second sling positioned in front of each platform and its respective first mentioned sling for engaging the head of the operator.

2. A thinning and harvesting machine comprising a frame, a platform suspended from the frame, a sling positioned in front of the platform for passing about the body of an operator resting upon the platform, and a second sling for passing about the head of the operator.

3. A thinning and harvesting machine comprising a carriage, a platform carried by the carriage, means carried by the carriage for supporting the body of an operator resting upon the platform, and a support for engaging the head of the operator.

4. A thinning and harvesting machine comprising a carriage, a cross bar carried by the carriage, a platform suspended from the cross bar, a sling positioned in front of the platform, a suspending chain carried by the cross bar and having the sling connected therewith, a second sling positioned in front of the first mentioned sling, and a supporting chain for the second sling carried by the cross bar.

5. A thinning and harvesting machine comprising a carriage, a platform carried by the carriage, and means positioned adjacent the platform for supporting an operator resting upon the platform with a portion of the body extending beyond the platform.

In testimony whereof I have hereunto set my hand.

VIRGIL H. NELSON.